United States Patent
Zhao et al.

(10) Patent No.: US 12,491,776 B2
(45) Date of Patent: Dec. 9, 2025

(54) METHODS AND SYSTEM FOR BALANCING TORQUE REQUEST DURING BATTERY POWER CONTROL

(71) Applicant: Ford Global Technologies, LLC, Dearborn, MI (US)

(72) Inventors: Yanan Zhao, Ann Arbor, MI (US); Ming Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 18/163,706

(22) Filed: Feb. 2, 2023

(65) Prior Publication Data

US 2024/0262216 A1    Aug. 8, 2024

(51) Int. Cl.
*B60L 15/20* (2006.01)
*B60K 1/02* (2006.01)

(52) U.S. Cl.
CPC ............ *B60L 15/2045* (2013.01); *B60K 1/02* (2013.01); *B60L 2240/421* (2013.01); *B60L 2240/423* (2013.01); *B60L 2250/26* (2013.01)

(58) Field of Classification Search
None
See application file for complete search history.

(56) References Cited

U.S. PATENT DOCUMENTS

| | | |
|---|---|---|
| 9,096,226 B2 | 8/2015 | Yu et al. |
| 10,363,918 B2 | 7/2019 | Kim et al. |
| 10,654,483 B2 * | 5/2020 | Nasu ............... B60K 17/16 |
| 10,889,188 B2 | 1/2021 | Kanda |
| 2009/0212626 A1 * | 8/2009 | Snyder ............ B60L 15/209 903/930 |
| 2013/0260956 A1 * | 10/2013 | Noguchi ............ B60K 1/02 477/3 |
| 2015/0012158 A1 * | 1/2015 | Makino ............. B60W 10/08 701/22 |
| 2016/0200212 A1 * | 7/2016 | Six .................. B60L 58/13 318/139 |
| 2016/0347203 A1 * | 12/2016 | Leng ............... B60L 50/60 |
| 2017/0158189 A1 * | 6/2017 | Kazuno ........... B60L 15/2045 |
| 2018/0237014 A1 * | 8/2018 | Nasu ............... B60W 10/02 |
| 2020/0180467 A1 * | 6/2020 | Baek ............. B60W 50/0098 |
| 2020/0262311 A1 * | 8/2020 | Miller .............. B60W 10/08 |
| 2021/0031634 A1 * | 2/2021 | Erbey ............. G01C 21/3453 |
| 2022/0348077 A1 * | 11/2022 | Ishida ............. B60W 50/038 |
| 2023/0051786 A1 * | 2/2023 | Flumeri ........... B60L 15/2036 |
| 2024/0034157 A1 * | 2/2024 | Godo .............. B60L 50/60 |

OTHER PUBLICATIONS

Zhao, Y. et al., "Methods and Systems for Controlling Electric Motor Torque in a Battery Electric Vehicle," U.S. Appl. No. 17/934,120, filed Sep. 21, 2022, 50 pages.

* cited by examiner

*Primary Examiner* — Peter D Nolan
*Assistant Examiner* — Jacob Kent Besteman-Street
(74) *Attorney, Agent, or Firm* — David Kelley; McCoy Russell LLP

(57) ABSTRACT

Methods and systems are provided for operating an electric vehicle during conditions when output of an electric energy storage device is limited. In one example, torque commands of left and right electric machines are adjusted in equal amounts so that output of the electric energy storage device may be limited. The approach may be applied to electric machines on front and rear sides of an electric vehicle.

17 Claims, 6 Drawing Sheets

METHODS AND SYSTEM FOR BALANCING TORQUE REQUEST DURING BATTERY POWER CONTROL

FIELD

The present description relates generally to methods and systems for operating an electric vehicle. The methods and systems may be particularly useful during conditions when maximum output capacity of a battery is constrained.

BACKGROUND/SUMMARY

A vehicle may include an electric energy storage device to supply power to one or more electric propulsion sources. The electric energy storage device may have quantified power limits that are not to be exceeded. An electric energy management system may operate to control electrical power demands on the electric energy storage device so that the electric energy storage device power limits are not exceeded. While it may be expected for devices and systems that are powered by the electric energy storage device operate differently when an electric energy storage device approaches its power limits, it may be desirable to control the way devices and systems respond when the electric energy storage device approaches its power limits.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
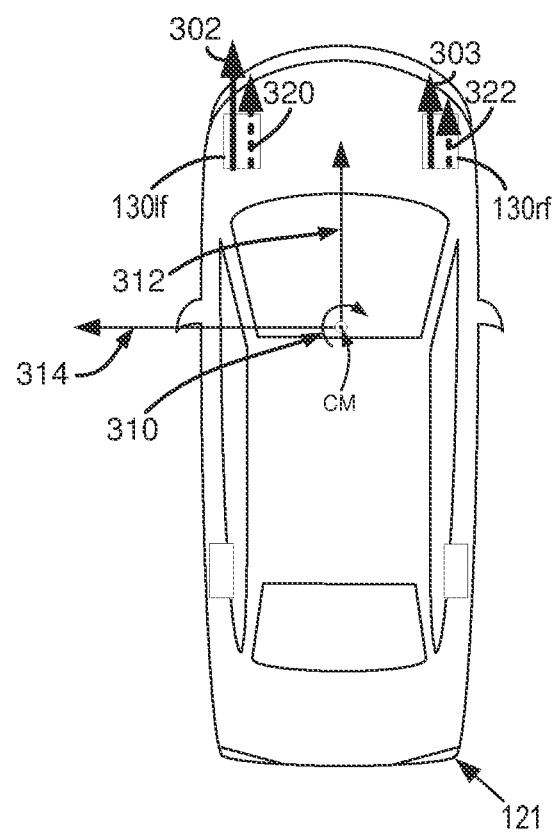
FIG. 3 is a figure that shows how vehicle operation may be affected by electric energy storage device limits.
Figure 4:
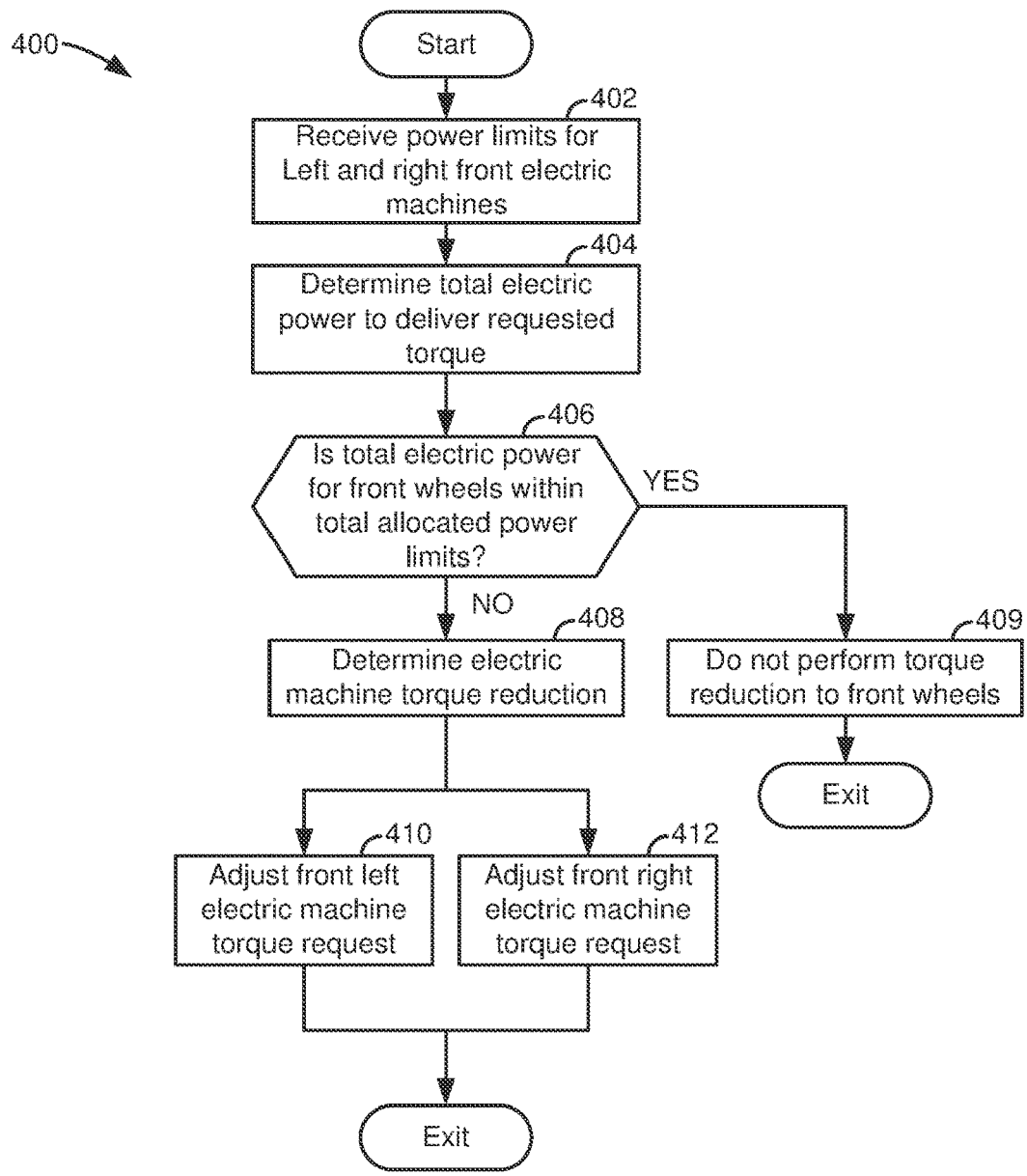
FIG. 4 shows a flowchart of an example method for controlling electric machines according to driver demand and limited electric energy storage device output.

The following description relates to systems and methods for operating a vehicle. FIGS. 1, 2, 5, and 6 show example vehicle configurations that may be controlled according to the method of FIG. 4. FIG. 3 shows an example torque distribution that may be possible when the control method of FIG. 3 is not applied to a vehicle that includes individual propulsion sources for vehicle wheels. The flowchart of a method for operating a vehicle is shown in FIG. 4.

An electric vehicle may include an electric energy storage device that electric propulsion sources may draw electrical power from. The electric energy storage device may have quantified power limits that are not to be exceeded. In order to enforce these limits, an electric energy management system may operate to control electrical power demands on the electric energy storage device so that the electric energy storage device power limits are not exceeded. In particular, the electric energy management system may limit an amount of electrical power that may be input to the electric energy storage device and limit an amount of electrical power that may be output from the electric energy storage device. However, it may be possible for vehicle driving dynamics to be affected when the amount of electrical power that electrical power consumers receive from the electric energy storage device is modified by an electric energy management system.

The inventors herein have recognized the above-mentioned issues and have developed a method for a battery electric vehicle, comprising: adjusting a torque command of an electric machine according to a torque reduction value that minimizes a difference between a total electrical power consumption via a right electric machine and a left electric machine to deliver a reduced torque request from an original torque request and a maximum total allocated discharge power of the right electric machine and the left electric machine; and generating wheel torque via the electric machine according to the torque command.

By adjusting a torque command of an electric machine according to a torque reduction value that minimizes a difference between a total electrical power consumption via a right electric machine and a left electric machine to deliver a reduced torque request from an original torque request and a maximum total allocated discharge power of the right electric machine and the left electric machine, it may be possible to provide the technical result controlling wheel torques in a way that allows battery output power to be limited to a desired amount.

The present description may provide several advantages. In particular, the approach may help to reliably limit battery output during conditions when battery output limiting is desired. Further, the approach may improve vehicle drivability during conditions when battery output is limited. In addition, the approach may improve vehicle stability during conditions when battery output is limited.

Figure 1:
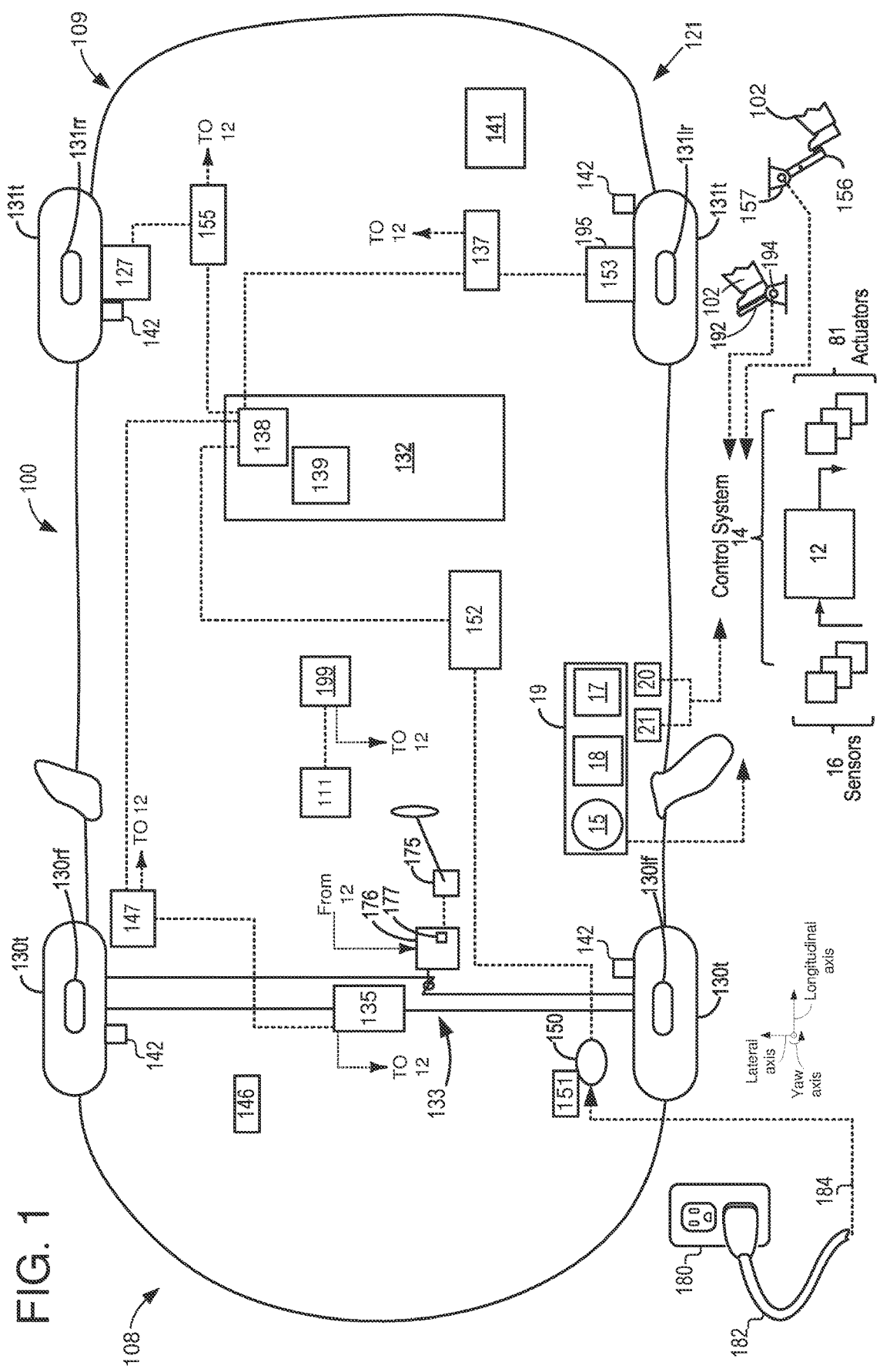
FIGS. 1 and 2 are schematic diagrams of example vehicle drivelines.

FIG. 1 illustrates an example vehicle propulsion system 100 for vehicle 121. In this example, vehicle propulsion system 100 includes three electric machines that may be applied to propel vehicle 121. Throughout the description of FIG. 1, mechanical connections between various components are illustrated as solid lines, whereas electric connections between various components are illustrated as dashed lines.

In this example, vehicle propulsion system 100 includes an electric machine 153 coupled to solely one a wheel, namely left rear wheel 131*lr*. Vehicle propulsion system 200 also includes a second electric machine 127 that is coupled solely to one wheel, namely right real wheel 131*rr*. Vehicle propulsion system 100 drives front axle 133 and front wheels 130*lf* and 130*rf* via third electric machine 135. Front axle 133 is positioned toward front 108 of vehicle 121 and electric machines 153 and 127 are positioned toward rear 109 of vehicle 121. Thus, vehicle propulsion system 100 may be propelled by between one and three electric machines.

Electric machine 135, electric machine 127, and electric machine 153 are controlled via controller 12. The controller 12 (e.g., a centralized integrated vehicle control module) receives signals from the various sensors shown in FIG. 1. In addition, controller 12 employs the actuators shown in FIG. 1 to adjust driveline operation based on the received signals and instructions stored in memory of controller 12.

Vehicle propulsion system 100 has a front axle 133 and independently controlled rear wheels 131*lr* and 131*rr*. Vehicle propulsion system 100 further includes front wheels 130*lf* and 13*rf*. In this example, front wheels 130*lf* and 130*rf* and/or rear wheels 131*lr* and 131*rr* may be driven via electric propulsion sources. The front axle 133 is coupled to electric machine 135. Electric machine 135 is shown incorporated into front axle 133.

Electric machines 127, 153, and 135 may receive electrical power from onboard electric energy storage device 132. Furthermore, electric machines 127, 153, and 135 may provide a generator function to convert the vehicle's kinetic energy into electric energy, where the electric energy may be stored at electric energy storage device 132 for later use by the electric machine 127, 153, and/or 135. A first inverter system controller (ISC1) 137 may convert alternating current generated by electric machine 153 to direct current for storage at the electric energy storage device 132 and vice versa. First inverter system controller 137 may also convert direct current from electric energy storage device 132 into alternating current to power electric machine 153. A second inverter system controller (ISC2) 155 may convert alternating current generated by electric machine 127 to direct current for storage at the electric energy storage device 132 and vice versa. The second inverter system controller 155 may also convert alternating current generated by electric machine 127 to direct current for storage at the electric energy storage device 132 and vice versa. A third inverter system controller 147 may convert alternating current generated by electric machine 135 to direct current for storage at the electric energy storage device 132 and vice versa. Further, third inverter system controller 147 may convert direct current supplied by electric energy storage device 132 to power electric machine 135.

Electric energy storage device 132 may be a battery, capacitor, inductor, or other electric energy storage device. In some examples, electric energy storage device 132 may be configured to store electric energy that may be supplied to other electric loads residing on-board the vehicle (other than the motor), including cabin heating and air conditioning, engine starting, headlights, cabin audio and video systems, etc.

Control system 14 may communicate with one or more of electric machine 135, electric machine 153, electric machine 127, energy storage device 132, etc. Control system 14 may receive sensory feedback information from one or more of electric machine 135, electric machine 127, electric machine 153, energy storage device 132, etc. Further, control system 14 may send control signals to one or more of electric machine 135, electric machine 127, electric machine 153, energy storage device 132, etc., responsive to this sensory feedback. Control system 14 may receive an indication of an operator requested output of the vehicle propulsion system from a human operator 102, or an autonomous controller. For example, control system 14 may receive sensory feedback from driver demand pedal position sensor 194 which communicates with driver demand pedal 192. Similarly, control system 14 may receive an indication of an operator requested vehicle braking via a human operator 102, or an autonomous controller. For example, control system 14 may receive sensory feedback from brake pedal position sensor 157 which communicates with brake pedal 156.

Energy storage device 132 may periodically receive electric energy from a power source 180 (e.g., a stationary power grid) residing external to the vehicle (e.g., not part of the vehicle) as indicated by arrow 184. As a non-limiting example, vehicle propulsion system 100 may be configured as a plug-in electric vehicle, whereby electric energy may be supplied to energy storage device 132 from power source 180 via an electric energy transmission cable 182. During a recharging operation of energy storage device 132 from power source 180, electric energy transmission cable 182 may electrically couple energy storage device 132 and power source 180. In some examples, power source 180 may be connected at inlet port 150. Furthermore, in some examples, a charge status indicator 151 may display a charge status of energy storage device 132.

In some examples, electric energy from power source 180 may be received by charger 152. For example, charger 152 may convert alternating current from power source 180 to direct current (DC), for storage at energy storage device 132.

While the vehicle propulsion system is operated to propel the vehicle, electric energy transmission cable 182 may be disconnected between power source 180 and energy storage device 132. Control system 14 may identify and/or control the amount of electric energy stored at the energy storage device, which may be referred to as the state of charge (SOC).

In other examples, electric energy transmission cable 182 may be omitted, where electric energy may be received wirelessly at energy storage device 132 from power source 180. For example, energy storage device 132 may receive electric energy from power source 180 via one or more of electromagnetic induction, radio waves, and electromagnetic resonance. As such, it may be appreciated that any suitable approach may be used for recharging energy storage device 132 from a power source that does not comprise part of the vehicle. In this way, electric machine 127, electric machine 153, and electric machine 135 may propel the vehicle by utilizing a stationary electrical power source.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle propulsion system 100 may also include inertial sensors 199. Inertial sensors 199 may comprise one or more of the following: longitudinal, latitudinal, vertical, yaw, roll, and pitch sensors (e.g., accelerometers). Axes of yaw, lateral acceleration, and longitudinal acceleration are as indicated. The control system may adjust electric machine output and/or the torque vectoring electric machines to increase vehicle stability in response to inertial sensor(s) 199. In another example, the control system may adjust an active suspension system 111 responsive to input from inertial sensors 199. Active suspension system 111 may comprise an active suspension system having hydraulic, electric, and/or mechanical devices, as well as active suspension systems that control the vehicle height on an individual corner basis (e.g., four corner independently controlled vehicle heights), on an axle-by-axle basis (e.g., front axle and rear axle vehicle heights), or a single vehicle height for the entire vehicle. Data from inertial sensor 199 may also be communicated to controller 12, or alternatively, inertial sensors 199 may be electrically coupled to controller 12.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include an accelerometer 20. Additionally, vehicle propulsion system 100 may further include an inclinometer 21. Vehicle propulsion system 100 may also include a steering control system 176 that may adjust a steering angle via adjusting a position of steering motor 177.

Vehicle propulsion system 100 may further include a brake system control module (BSCM) 141 to apply and release friction wheel brakes 142. In some examples, BSCM 141 may comprise an anti-lock braking system, such that tires (e.g., 130*t* and 131*t*) of wheels (e.g. 130*lf,* 130*rf,* 131*lr,* and 131*rr*) may maintain tractive contact with the road surface according to driver inputs while braking, which may thus prevent the wheels from locking up, to prevent skidding. In some examples, BSCM 141 may receive input from wheel speed sensors 195.

Vehicle propulsion system 100 may further include a motor electronics coolant pump (MECP) 146. MECP 146 may be used to circulate coolant to diffuse heat generated by at least electric machine 127, electric machine 153, and electric machine 135 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) 197, wheel speed sensor(s) 195, inertial sensors 199, etc. In some examples, steering angle sensor 175, sensors associated with electric machine 135, electric machine 127, and electric machine 153, etc., may communicate information to controller 12, regarding various states of electric machine operation.

Vehicle propulsion system 100 may also include an onboard navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 135, electric machine 127, and electric machine 153) based on an operator input. Various examples of the operator interface 15 may include interfaces that apply a physical apparatus, such as an active key, that may be inserted into the operator interface 15 to activate electric machines 135, 127, and 153, or may be removed to shut down the electric machines 135, 127, and 153 to turn off the vehicle. Other examples may include a passive key that is communicatively coupled to the operator interface 15. The passive key may be configured as an electronic key fob or a smart key that does not have to be inserted or removed from the operator interface 15 to operate the vehicle engine 110. Rather, the passive key may need to be located inside or proximate to the vehicle (e.g., within a threshold distance of the vehicle). Still other examples may additionally or optionally use a start/stop button that is manually pressed by the operator to start or shut down the engine 110 and turn the vehicle on or off. In other examples, a remote engine start may be initiated remote computing device (not shown), for example a cellular telephone, or smartphone-based system where a user's cellular telephone sends data to a server and the server communicates with the vehicle controller 12 to start the engine.

Figure 2:
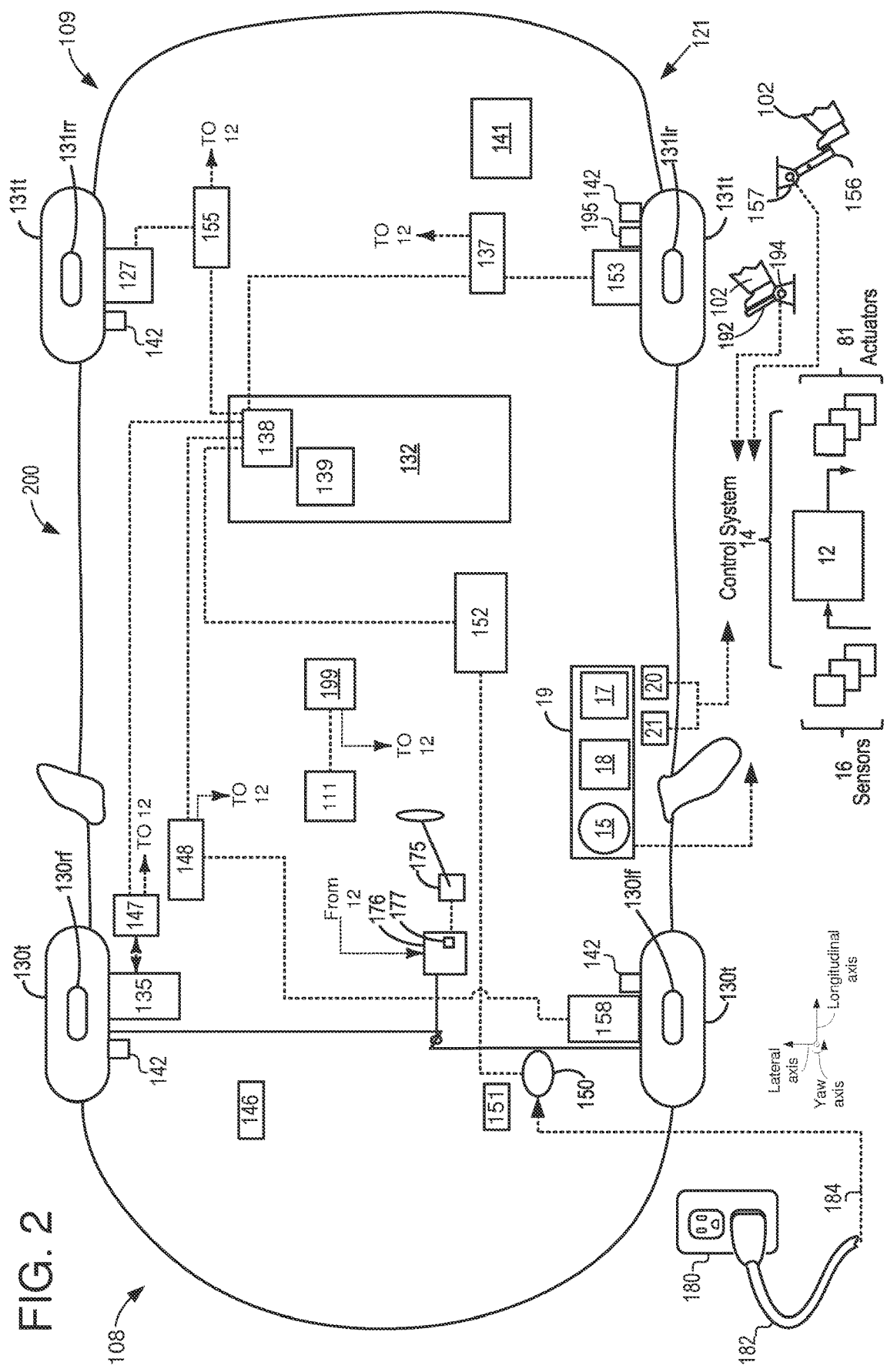

Referring now to FIG. 2, a second example vehicle propulsion system 200 for vehicle 121 is shown. In this example, vehicle propulsion system 200 includes four electric machines that may be applied to propel vehicle 121. Some elements of FIG. 2 are indicated with the same numerical identifies that are shown in FIG. 1. Elements of FIG. 2 that are indicated with the same numerical indicators shown in FIG. 1 are equivalent to those shown in FIG. 1. For example, electric energy storage device 132 shown in FIG. 2 is the same electric energy storage device 132 that is shown in FIG. 1. Therefore, for the sake of brevity, descriptions of equivalent elements in FIG. 2 will not be repeated. Rather, the description of FIG. 2 focuses on elements that are unique to the vehicle propulsion system shown in FIG. 2.

In this example, vehicle propulsion system 200 includes a first electric machine 153 that is coupled to solely one wheel, namely left rear wheel 131*lr*. Vehicle propulsion system 200 also includes a second electric machine 127 that is coupled to solely one wheel, namely right rear wheel 131*rr*. Vehicle propulsion system includes a fourth electric machine 158 that is coupled solely to left front wheel 130*lf*. Vehicle propulsion system also includes a third electric machine 135 that is coupled solely to right front wheel 130*rf*. Thus, each wheel of vehicle propulsion system 200 may be driven individually by an electric machine such that there is individual control of each wheel.

A first inverter system controller 137 may convert alternating current generated by first electric machine 153 to direct current for storage at the electric energy storage device 132 and vice versa. Second inverter system controller 155 may convert alternating current generated by second electric machine 153 to direct current for storage at the electric energy storage device 132 and vice versa. Third inverter system controller 147 may convert alternating current generated by third electric machine 135 to direct current for storage at the electric energy storage device 132 and vice versa. Fourth inverter system controller 148 may convert alternating current generated by fourth electric machine 158 to direct current for storage at the electric energy storage device 132 and vice versa.

The systems of FIGS. 1-3 provide for a vehicle system, comprising: a right electric machine; a left electric machine; a controllers including executable instructions stored in non-transitory memory that cause the controller to generate a torque command for the right electric machine according to a torque reduction value that minimizes a difference between a total electrical power consumption via the right electric machine and the left electric machine to deliver a reduced torque request from an original torque request and a minimum total allocated discharge power of the right electric machine and the left electric machine. In a first example, the vehicle system includes where the torque command is equal to a requested torque for the right electric machine and the torque reduction value. In a second example that may include the first example, the vehicle system further comprises generating a torque command for the left electric machine according to a torque reduction value that minimizes a difference between the total electrical power consumption via the right electric machine and the left electric machine to deliver the reduced torque request from the original torque request and a minimum total allocated discharge power of the right electric machine and the left electric machine. In a third example that may include one or both of the first and second examples, the vehicle system includes where torque command is generated when a total amount of electrical power for the right electric machine and the left electric machine is not within allocated power limits. In a fourth example that may include one or more of the first through third examples, the vehicle system further comprises additional instructions to not generate an adjusted torque command when the total amount of electrical power for the right electric machine and the left electric machine is within the allocated power limits. In a fifth example that may include one or more of the first through fourth examples, the vehicle system includes where the allocated power limits include a maximum electrical power level for the electric machine and a minimum electrical power level for the electric machine. In a sixth example that may include one or more of the first through fifth examples, the vehicle system further comprises additional executable instructions to determine a total electrical power to deliver a requested torque, where the requested torque is based on a driver demand pedal position.

Referring now to FIG. 3, a sketch of a vehicle 121 including a yaw moment 310 about a center vehicle mass (CM) is shown. The vehicle's longitudinal axis is indicated at 312 and the vehicle's lateral axis is indicated at 314. The vehicle's front wheels are indicated at 130*lf* and 130*rf*. In FIG. 3, the solid arrows 302 and 303 represent magnitude for requested torque for the left front wheel 130*lf* and the right front wheel 130*rf*. The dashed arrows 320 and 322 represent magnitude for requested reduced torque for the left front wheel 130*lf* and the right front wheel 130*rf*. The requested reduced torque values are adjusted according to the power management system that controls electric energy storage device input and output power. The difference between the request torques of the right and left front wheels and the requested reduced torques of the right and left front wheels may result in an unintended yaw moment about the center of vehicle mass as indicated by yaw moment 310. The unintended yaw moment may be different than a requested or desired yaw moment about the center of the front wheels. The method of FIG. 4 may operate to mitigate the possibility of an unintended yaw moment.

Referring now to FIG. 4, an example method for operating an electric vehicle is shown. The method of FIG. 4 may be incorporated into and may cooperate with the systems of FIGS. 1 and 2. Further, at least portions of the method of FIG. 4 may be incorporated as executable instructions stored in non-transitory memory while other portions of the method may be performed via a controller transforming operating states of devices and actuators in the physical world.

Method 400 is described in terms associated with controlling left and right front wheels of a vehicle. However, method 400 may also be applied to controlling left and right rear wheels of a vehicle by merely substituting rear wheel for front wheel in the control actions, calculations, and control parameters described herein. Discharging for an electric machine is indicated by a positive sign while supplying charge to the electric machine is indicated via a negative sign.

At 402, method 400 receives power limits (e.g., power levels that are not to be exceeded) for the electric machines that may supply and/or generate electrical power from the vehicle's front wheels. In one example, method 400 may receive a maximum electrical power level for the electric machine that is associated with the front left wheel (pwr_max_fl), a minimum electrical power level for the electric machine that is associated with the front left wheel (pwr_min_fl), a maximum electrical power level for the electric machine that is associated with the front right wheel (pwr_max_fr), and a minimum electrical power level for the electric machine that is associated with the front right wheel (pwr_min_fr). Method 400 may receive these limits via controllers that are associated with the front wheel electric machines or from a different routine in the controller that executes method 400. Method 400 proceeds to 404.

At 404, method 400 determines each electric machine's estimated total amount of electrical power to deliver a requested torque that is determined from driver demand and wheel torque distribution at the present electric machine speed. The estimated total amount of electrical power consumed by the front left wheel electric machine is determined via the following equations:

$$\text{pwr\_des\_fl} = \text{tq\_reqDes\_mtrfl} * \text{spd\_mtrfl} + \text{pwr\_mtrLoss\_fl} \quad (1)$$

$$\text{pwr\_mtrLoss\_fl} = f(\text{tq\_reqDes\_mtrfl}, \text{spd\_mtrfl}) \quad (2)$$

The estimated total amount of electrical power consumed by the front right wheel electric machine is determined via the following equations:

$$\text{pwr\_des\_fr} = \text{tq\_reqDes\_mtrfr} * \text{spd\_mtrfr} + \text{pwr\_mtrLoss\_fr} \quad (3)$$

$$\text{pwr\_mtrLoss\_fr} = f(\text{tq\_reqDes\_mtrfr}, \text{spd\_mtrfr}) \quad (4)$$

where pwr_des_fl is the estimated total amount of electrical power to deliver the requested torque to the front left wheel, pwr_des_fr is the estimated total amount of electrical power to deliver the requested torque to the front right wheel, tq_reqDes_mtrfl is the torque that is requested to be delivered via the electric machine that is coupled to the front left wheel, tq_reqDes_mtrfr is the torque that is requested to be delivered via the electric machine that is coupled to the front right wheel, spd_mtrfl is the present speed of the front left wheel, spd_mtrfr is the present speed of the front right wheel, pwr_mtrLoss_fl is the electrical power loss of the front left wheel, pwr_mtrLoss_fr is the electrical power loss of the front right wheel, and f is a function that returns electrical power loss of an electric machine. The values of tq_reqDes_mtrfl and tq_reqDes_mtrfr are determined from a driver demand torque that may be determined from driver demand pedal position. The values of tq_reqDes_mtrfl and tq_reqDes_mtrfr are also determined via wheel torque distribution algorithm considering vehicle operation conditions including vehicle speed, longitudinal and lateral acceleration, steering angle inputs, road surface conditions, etc. Method 400 proceeds to 406 after the total electrical power to be consumed by the front left and right electric machines is determined.

At 406, method 400 judges whether or not the total amount of electrical power for the front wheels is within the allocated power limits. In one example, method 400 makes the judgement according to the following conditional statement:

if (pwr_min_fl+pwr_min_fr)<=(pwr_des_fl+
  pwr_des_fr)<=(pwr_max_fl+pwr_max_fr)

where the parameters (e.g., arguments pwr_min_fl, pwr_min_fr, etc.) are as previously described, if is a statement that checks to determine if the conditions that follow are true, and <= is a less than or equal to symbol. Thus, when the conditions in the statement (e.g., the if statement) conditions are true, the answer is yes and method 400 proceeds to 409.

At 409, method commands the left and right front wheel electric machines to meet their requested torque values. In one example, method 400 may command the front right and front left electric machines via the following statements;

$$tq\_reqPwrCtrl\_mtrfl = tq\_reqDes\_mtrfl \quad (5)$$

$$tq\_reqPwrCtrl\_mtrfr = tq\_reqDes\_mtrfr \quad (6)$$

where tq_reqPwrCtrl_mtrfl is the torque request command to the front left electric machine and tq_reqPwrCtrl_mtrfr is the torque request command to the front right electric machine. Method 400 proceeds to exit.

At 408, method 400 determines the electric machine torque reduction to meet the electric energy storage device limits. In one example, the electric machine torque reduction is determined via finding a solution to an optimization problem, and where tq_red (e.g., the electric machine torque reduction) is the solution to the optimization problem. The following discharge minimization problem is solved when the electric machine is discharging (e.g., consuming electrical power that is provided by the electric energy storage device):

$$\text{find } tq\_red \quad (7)$$

$$\text{which minimizes } (A - B)$$

$$\text{subject to } A <= B$$

where tq_red is the torque reduction for the electric machines, where the determined tq_red is a value that minimizes A-B and is subject to A<=B), A=[(tq_reqDes_mtrfl−tq_red)*spd_mtrfl+pwr_mtrLoss_fl+ (tq_reqDes_mtrfr−tq_red)*spd_mtrfr+pwr_mtrLoss_fr], and B=pwr_max_fl+pwr_max_fr, where spd_mtrfl is the rotational speed of the front left electric machine, spd_mtrfr is rotational speed of the front right electric machine, pwr_mtrLoss_fl is power losses of the front left electric machine at present operating conditions, pwr_mtrLoss_fr is power losses of the front right electric machine at present operating conditions, and where the other parameters are as previously described. A represents the estimated total electrical power consumption by the front right and front left electric machines to deliver the reduced torque request from its original torque request (e.g., tq_reqDes_mtrfl and tq_reqDes_mtrfr). B represents the maximum total allocated discharge power for the front left and front right electric machines. In one example, the value of tq_red that minimizes (A-B) and that is subject to A<=B may be determined via finding the smallest or minimal value of tq_red when solving minimize (A-B), subject to A<=B, by beginning with tq_red being a very small positive value, calculating (A-B), and checking if A<=B. The process can be done iteratively via incrementing tq_red with a small amount, and each time calculating A-B until A<=B becomes TRUE the first time. The value of tq_red could be in the range between zero and the minimum value of tq_reqDes_mtrfl and tq_reqDes_mtrfr.

In another example, the electric machine torque reduction is determined via finding a solution to a second optimization problem where tq_red is the solution to the optimization problem. The following charging minimization problem is solved when the electric machine is charging (e.g., supplying electrical power to the electric energy storage device):

$$\text{find } tq\_red \quad (8)$$

$$\text{which minimizes } (A - C)$$

$$\text{subject to } A >= C$$

where tq_red is the torque reduction for the electric machines, where the determined tq_red is a value that minimizes A-C and is subject to A>=C, A is as previously described, and C=pwr_min_fl+pwr_min_fr. C represents the minimum total amount of charging power that is allocated to the front left and right electric machines. In one example, the value of tq_red that minimizes (A-C) and that is subject to A>=C may be determined via finding the smallest or minimal absolute value of tq_red when solving minimize (A-C), subject to A>=C, by beginning with tq_red a very small absolute value, calculating (A-C), and checking if A>=C. The process may be performed iteratively via incrementing tq_red with a small absolute value, and each time calculating A-C until A>=C becomes TRUE the first time. The value of tq_red could be in the range between zero and the greater value of the tq_reqDes_mtrfl and tq_reqDes_mtrfr assuming both corresponding motor speeds are positive. Charging power is denoted via a − sign. Method 400 proceeds to 410 and 412 after the torque reduction amount has been determined.

At 410, adjusts the torque command for the front left electric machine by adjusting the requested front left electric machine torque according to a torque reduction amount. The torque command for the front left electric machine that has been reduced for electric energy storage power control is:

$$Tq\_reqPwrCtrl\_mtrfl = tq\_reqDes\_mtrfl - tq\_red \quad (9)$$

where Tq_reqPwrCtrl_mtrfl is the torque command for the front left electric machine that has been reduced for electric energy storage device power control, tq_red is determined via the minimization problem denoted in either equation 7 or equation 8, and tq_reqDes_mtrfl is the requested torque for the front left electric machine. Method 400 proceeds to exit.

At 412, adjusts the torque command for the front right electric machine by adjusting the requested front right electric machine torque according to a torque reduction amount. The torque command for the front right electric machine that has been reduced for electric energy storage power control is:

$$Tq\_reqPwrCtrl\_mtrfr = tq\_reqDes\_mtrfr - tq\_red \quad (10)$$

where Tq_reqPwrCtrl_mtrfr is the torque command for the front right electric machine that has been reduced for electric energy storage device power control, tq_red is as described in either equation 7 or equation 8, and tq_reqDes_mtrfr is the requested torque for the front right electric machine. Method 400 proceeds to exit.

In this way, torque delivery between left and right wheels at a front or rear of a vehicle may be managed in the presence electric energy power management control. For example, if an electric energy storage device is being limited during battery discharge, electric machine torque for left and right wheels may be compensated so that the electric energy storage device power is limited while managing vehicle yaw. Similarly, if an electric energy storage device is being limited during battery charge, electric machine torque for left and right wheels may be compensated so that the electric energy storage device power is limited while managing vehicle yaw.

The method of FIG. 4 provides for a method for a battery electric vehicle, comprising: adjusting a torque command of an electric machine according to a torque reduction value that minimizes a difference between a total electrical power consumption via a right electric machine and a left electric machine to deliver a reduced torque request from an original torque request and a maximum total allocated discharge power of the right electric machine and the left electric machine; and generating wheel torque via the electric machine according to the torque command. In a first example, the method includes where the electric machine is the right electric machine. In a second example that may include the first example, the method includes where the electric machine is the left electric machine. In a third example that may include one or both of the first and second examples, the method the method includes where the right electric machine is coupled to a right wheel of the battery electric vehicle. In a fourth example that may include one or more of the first through third examples, the method includes where the left electric machine is coupled to a left wheel of the battery electric vehicle. In a fifth example that may include one or more of the first through fourth examples, the method includes where the adjusting is performed when a total amount of electrical power for the right electric machine and the left electric machine is not within allocated power limits. In a sixth example that may include one or more of the first through fifth examples, the method further comprises not adjusting the torque command when the total amount of electrical power for the right electric machine and the left electric machine is within the allocated power limits. In a seventh example that may include one or more of the first through sixth examples, the method includes where the allocated power limits include a maximum electrical power level for the electric machine and a minimum electrical power level for the electric machine.

The method of FIG. 4 also provides for a method for a battery electric vehicle having a centralized integrated vehicle control module, the battery electric vehicle having a left electric machine and a right electric machine positioned at a same side (e.g., a front side or a rear side) of the battery electric vehicle, the method comprising: receiving total allocated power limits for the right motor and the left motor; determining, by the centralized integrated vehicle control module, a total required electrical power to deliver a desired torque request for each motor; and in response to the total required electrical power exceeding the total allocated power limits, reducing the desired torque request for each motor by a same amount of torque. In a first example, the method further comprises generating a wheel torque via the desired torque request. In a second example that may include the first example, the method includes where the same amount of torque is based on a minimization. In a third example that may include one or both of the first and second examples, the method includes where the minimization is based on a difference between a total electrical power consumption via the right motor and the left motor to deliver a reduced torque request from an original torque request and a maximum total allocated discharge power of the right motor and the left motor. In a fourth example that may include one or more of the first through third examples, the method includes where the minimization is based on a difference between a total electrical power consumption via the right motor and the left motor to deliver a reduced torque request from an original torque request and a minimum total allocated discharge power of the right motor and the left motor.

Figure 5:
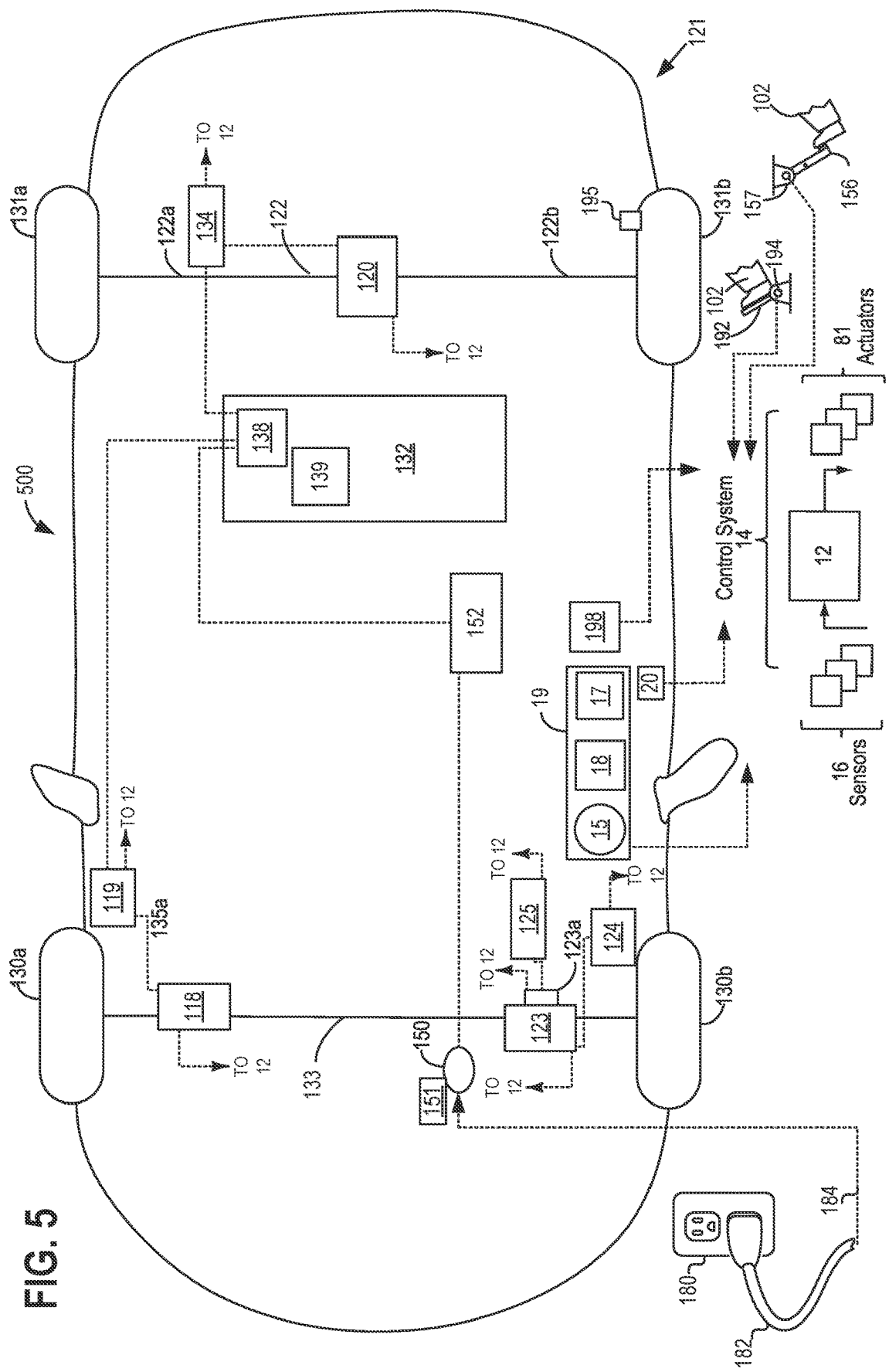
FIGS. 5 and 6 are schematic diagrams of example alternative vehicle drivelines.

Referring now to FIG. 5, a third example vehicle propulsion system 500 for vehicle 121 is shown. In this example, vehicle propulsion system 500 includes three electric machines that may be applied to propel vehicle 121. Some elements of FIG. 5 are indicated with the same numerical identifies that are shown in FIG. 1. Elements of FIG. 5 that are indicated with the same numerical indicators shown in FIG. 1 are equivalent to those shown in FIG. 1. For example, electric energy storage device 132 shown in FIG. 5 is the same electric energy storage device 132 that is shown in FIG. 1. Therefore, for the sake of brevity, descriptions of equivalent elements in FIG. 5 will not be repeated. Rather, the description of FIG. 5 focuses on elements that are unique to the vehicle propulsion system shown in FIG. 5.

Vehicle propulsion system 500 includes a first electric machine 120, a second electric machine 118, and a third electric machine 123 mechanically coupled to the driveline of the vehicle 121. In one example, each of the first, second, and third electric machines 120, 118, and 123 includes a propulsive force electric machine such as an electric motor. Accordingly, vehicle 121 may include a 3-motor battery electric vehicle (BEV), whereby two of the electric machines (123 and 118) are mechanically coupled to both corners (e.g., at opposite ends) of a front axle 133, and one of the electric machines (120) is mechanically coupled to the rear axle 122. Although not explicitly illustrated in FIG. 5, in an alternative example, the vehicle 121 may further include a 3-motor BEV, whereby two of the electric machines are mechanically coupled to both corners (e.g., at opposite ends) of the rear axle 122 and one of the electric machines is mechanically coupled to the front axle 133.

Figure 6:
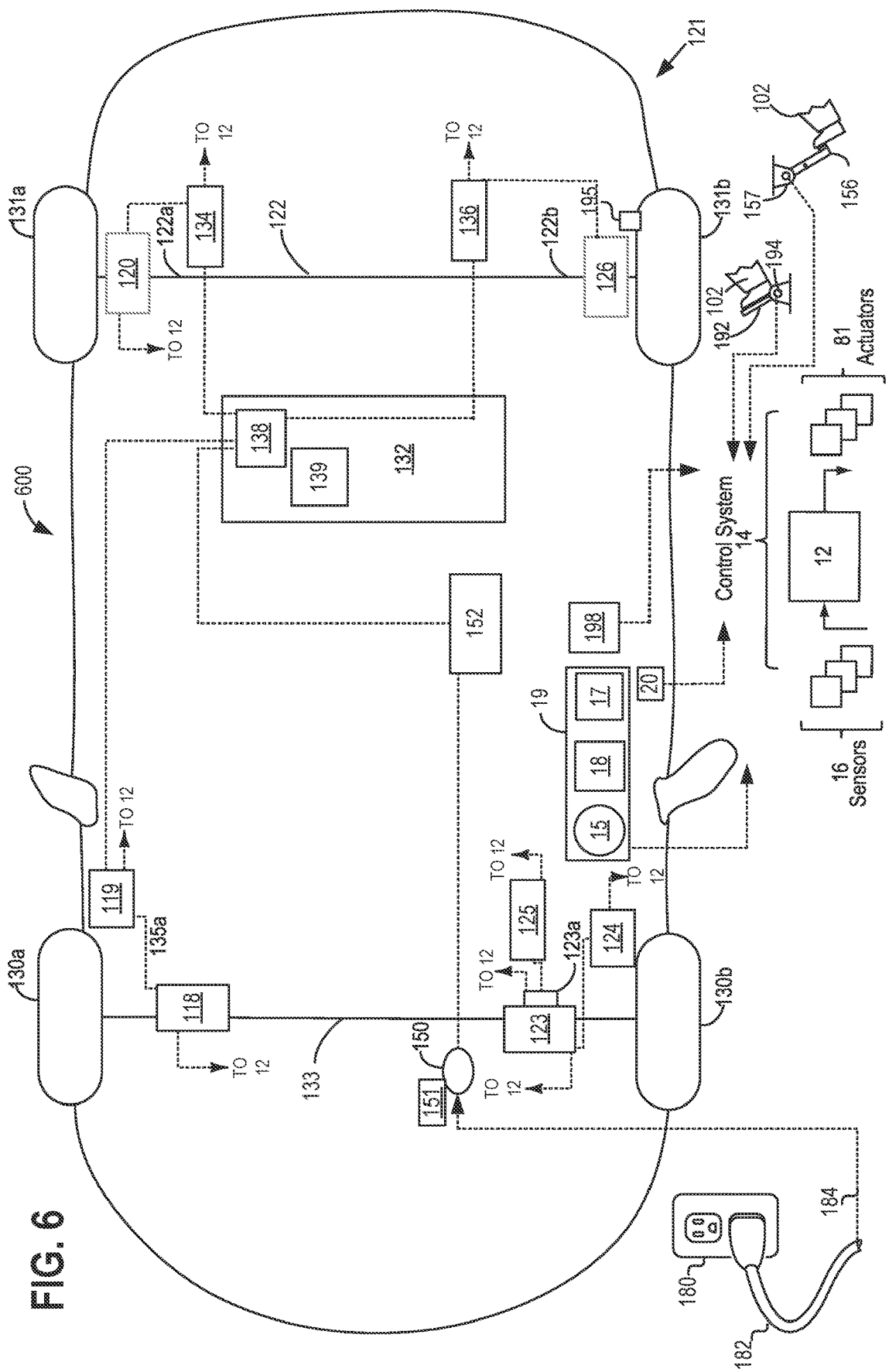

In an additional or alternative embodiment shown in FIG. 6, vehicle propulsion system 600 may include a fourth electric machine 126. In one example, the fourth electric machine 126 includes a propulsive force electric machine such as an electric motor. Accordingly, vehicle 121 may include a 4-motor battery electric vehicle (BEV), whereby two of the electric machines (123 and 118) are mechanically coupled to both corners (e.g., at opposite ends) of a front axle 133, and the other two of the electric machines (120 and 126) are mechanically coupled to both corners (e.g., at opposite ends) of the rear axle 122. Although not depicted in FIGS. 5 and 6, the methods and systems described herein may also apply to a hybrid electric vehicle (HEV), whereby the vehicle 121 includes a powertrain with an internal combustion engine (not shown) and two electric machines electrically coupled to both corners of a front axle of the HEV or two electric machines electrically coupled to both corners of the rear axle of the HEV.

First, second, third, and fourth electric machines 120, 118, 123, and 126 are communicatively coupled to a controller 12, and are controlled by way of the controller 12. In one example, first, second, third, and fourth electric machines 120, 118, 123, 126 may each operate independently. For example, electric machines 120, 118, 123, 126 may be independently controlled by controller 12 with respect to one or more of torque, Tq, power, P, and motor speed, w. The motor speed may be determined based on the vehicle speed, wheel size, gear ratio, and the like. In another example, the motor speed may be derived directly from measurement with a motor resolver sensor. Controller 12 receives signals from the various sensors shown in FIGS. 5 and 6. In addition, controller 12 employs the actuators shown in FIGS. 5 and 6 to adjust driveline operation responsive to the received signals, and based on instructions stored in memory of controller 12, as exemplified by the methods and systems described herein.

Vehicle propulsion system 100 includes a front axle 133 and a rear axle 122. In some examples, rear axle 122 may comprise two half shafts, for example first half shaft 122*a*, and second half shaft 122*b*. Vehicle propulsion system 100 further includes front wheels 130*a* and 130*b*, and rear wheels 131*a* and 131*b*. As depicted in FIGS. 5 and 6, front wheel 130*a* may represent the front right (FR) wheel, front wheel 130*b* may represent the front left (FL) wheel coupled to the front axle at an opposite side of the FR wheel, rear wheel 131*a* may represent the rear right (RR) wheel, and rear wheel 131*b* may represent the rear left (RL) wheel coupled to the rear axle at an opposite side of the RR wheel. Furthermore, one or more of the front wheels 130*a* and 130*b*, and the rear wheels 131*a* and 131*b*, may be driven by way of electrical propulsion sources, such as one of electric machines 120, 118, 123, 126. For example, the rear axle 122 may be mechanically coupled to one or more electric machines such as electric machine 120 and electric machine 126. In FIG. 5, electric machine 120 is positioned at the rear axle 122 between rear wheel 131*a* and rear wheel 131*b*. Alternatively, as shown in FIG. 6, the electric machine 120 may be positioned at a corner of rear axle 122 more proximal to rear wheel 131*a*, and electric machine 126 may be positioned at the other corner of rear axle 122 more proximal to wheel 131*b*. Electric machine 118 is positioned at a corner of front axle 133 more proximal to the front wheel 130*a*, and electric machine 123 is positioned at the other corner of front axle 133 more proximal to the front wheel 130*b*. As described above, in another embodiment, a single electric machine may be coupled to and positioned at the front axle 133 (e.g., between front wheels 130*a* and 130*b*) and two electric machines may be coupled to and positioned at the rear axle 122.

Electric machines 120, 118, 123, and 126 may receive electrical power from electric energy storage device 132. In one example, electric energy storage device 132 is an onboard electrical energy storage device such as a high-voltage (HV) battery. In one example, the HV battery includes a rechargeable lithium ion battery. Furthermore, one or more of the electric machines 120, 118, 123, and 126 may include a means for generating electrical power. In particular, electric machines 120, 118, 123, and 126 may generate electrical power by converting the kinetic energy of the vehicle 121 into electrical energy, where the electrical energy may be stored at electric energy storage device 132 for later use by electric machines 120, 118, 123, and/or 126.

A first inverter system controller 134 may convert alternating current (AC) generated by electric machine 120 to direct current (DC) for storage at electric energy storage device 132. Additionally, the first inverter system controller 134 may convert DC transmitted from electric energy storage device 132 to AC for powering the electric machine 120. A second inverter system controller 119 may convert AC generated by electric machine 135 to DC for storage at electric energy storage device 132. Additionally, the second inverter system controller 119 may convert DC transmitted from electric energy storage device 132 to AC for powering the electric machine 135. A third inverter system controller 124 may convert AC generated by electric machine 123 to DC for storage at electric energy storage device 132. Additionally, the third inverter system controller 124 may convert DC transmitted from electric energy storage device 132 to AC for powering the electric machine 123. A fourth inverter system controller 136 may convert AC generated by electric machine 126 to DC for storage at electric energy storage device 132. Additionally, the fourth inverter system controller 136 may convert DC transmitted from electric energy storage device 132 to AC for powering the electric machine 126.

For the case of a BEV, vehicle 121 may be operated according to battery power control and power allocation control. Battery power control refers to ensuring that the instantaneous power usage during vehicle operation from all of the electric motors 123, 118, 120, and 126 and high-voltage (HV) accessories (e.g. HVAC, lights, and the like) does not exceed the total available power from the electric energy storage device 132. Power allocation control refers to regulation and allocation of the available power (excluding power consumption from HV accessories) to each of the electric motors 123, 118, 120, and 126. Power allocation to each of the electric motors 123, 118, 120, and 126 may further depend on operator input when driving the vehicle 121. As examples, operator input when driving the vehicle may include one or more of depressing an accelerator pedal 192, depressing a brake pedal 156, turning a steering wheel, selecting a transmission gear, and the like, to operate the vehicle at a desired speed and in a desired direction. In particular, responsive to operator input, the controller 12 may determine a requested torque, $Tq_i$, to be generated at each of the $i^{th}$ electric motors 118, 123, 120, and 126 positioned at vehicle wheels 130*a*, 130*b*, 131*a*, and 131*b*, in order to propel the vehicle at the desired vehicle speed and in the desired direction. Furthermore, responsive to the operator input, the controller 12 may allocate a portion of the available power from the electric energy storage device 132 to each of the electric motors 118, 123, 120, and 126 positioned at vehicle wheels 130*a*, 130*b*, 131*a*, and 131*b*, in order to generate the corresponding requested torque.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a battery electric vehicle, comprising:
   adjusting a torque command of an electric machine according to a torque reduction value that minimizes a difference between an estimated total electrical power consumption by a right electric machine and a left electric machine, where the adjusting is executed to deliver a reduced torque request from an original torque request and reduces a maximum total allocated discharge power of the right electric machine and the left electric machine; and
   generating wheel torque via the electric machine according to the torque command, where the adjusting is performed when the estimated total electrical power consumption for the right electric machine and the left electric machine is not within allocated power limits.

2. The method of claim 1, where the estimated total electrical power consumption considers a torque command for the right electric machine, speed of the right electric machine, and power loss of the right electric machine that is based on the torque command for the right electric machine.

3. The method of claim 2, where the estimated total electrical power consumption considers a torque command for the left electric machine, speed of the left electric machine, and power loss of the left electric machine that is based on the torque command for the left electric machine.

4. The method of claim 1, where the right electric machine and the left electric machine are on a front side of the vehicle.

5. The method of claim 1, where the right electric machine and the left electric machine are on a rear side of the vehicle.

6. The method of claim 1, further comprising not adjusting the torque command when the estimated total electrical power consumption for the right electric machine and the left electric machine is within the allocated power limits.

7. The method of claim 6, where the allocated power limits include a maximum electrical power level for the electric machine and a minimum electrical power level for the electric machine.

8. A vehicle system, comprising:
   a right electric machine;
   a left electric machine;
   cause the controller to:
   adjusting a torque command of an electric machine according to a torque reduction value that minimizes a difference between an estimated total electrical power consumption by the right electric machine and the left electric machine, where the adjusting is executed to deliver a reduced torque request from an original torque request and reduces a maximum total allocated discharge power of the right electric machine and the left electric machine; and
   generating wheel torque via the electric machine according to the torque command, where the adjusting is performed, and the torque command is generated, when the estimated total electrical power consumption for the right electric machine and the left electric machine is not within allocated power limits.

9. The vehicle system of claim 8, where the torque command is equal to a requested torque for the right electric machine minus the torque reduction value.

10. The vehicle system of claim 8, further comprising generating a torque command for the left electric machine according to the torque reduction value that minimizes a difference between the total electrical power consumption via the right electric machine and the left electric machine to deliver the reduced torque request from the original torque request and a maximum total allocated discharge power of the right electric machine and the left electric machine, where the torque reduction is value is adjusted incrementally.

11. The vehicle system of claim 8, further comprising additional instructions to not generate an adjusted torque command when the total amount of electrical power for the right electric machine and the left electric machine is within the allocated power limits.

12. The vehicle system of claim 11, where the allocated power limits include a maximum electrical power level for the right electric machine and a minimum electrical power level for the right electric machine.

13. A method for a battery electric vehicle having a centralized integrated vehicle control module, the battery electric vehicle having a left motor and a right motor positioned at a same side of the battery electric vehicle, the method comprising:
   receiving total allocated power limits for the right motor and the left motor;
   determining, by the centralized integrated vehicle control module, a total required electrical power to deliver a desired torque request for each motor; and
   in response to the total required electrical power exceeding the total allocated power limits, minimizing a difference between an estimated total electrical power consumption by a right electric machine and a left electric machine and reducing the desired torque request for each motor, where reducing the desired torque request is performed when the estimated total electric power consumption of the right electric machine and the left electric machine is not within allocated power limits.

14. The method of claim 13, further comprising generating a wheel torque via the desired torque request, and where the same side of the battery electric vehicle is a front side.

15. The method of claim 13, where the difference results in an unintended yaw moment about a center of a vehicle mass.

16. The method of claim 13, further comprising delivering a reduced torque request from an original torque request and a maximum total allocated discharge power of the right motor and the left motor.

17. The method of claim 13, further comprising delivering a reduced torque request from an original torque request and a minimum total allocated charge power of the right motor and the left motor.

* * * * *